US007120325B1

United States Patent
Uchida

(10) Patent No.: US 7,120,325 B1
(45) Date of Patent: Oct. 10, 2006

(54) TWO-DIMENSIONAL OPTICAL WAVEGUIDE APPARATUS, AND OPTO-ELECTRONIC HYBRID CIRCUIT BOARD USING SUCH OPTICAL WAVEGUIDE APPARATUS

(75) Inventor: Tatsuro Uchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 10/626,535

(22) Filed: Jul. 25, 2003

(30) Foreign Application Priority Data

Jul. 29, 2002 (JP) .............................. 2002-219251

(51) Int. Cl.
*G02B 6/12* (2006.01)
(52) U.S. Cl. ........................................ 385/14
(58) Field of Classification Search ................. 385/14, 385/129–132, 47, 31, 46
See application file for complete search history.

(56) References Cited

U.S. PATENT DOCUMENTS

| 4,611,883 | A | | 9/1986 | Myer | |
|---|---|---|---|---|---|
| 5,198,008 | A | | 3/1993 | Thomas | |
| 5,446,579 | A | * | 8/1995 | Lomashevitch | 359/333 |
| 5,822,475 | A | * | 10/1998 | Hirota et al. | 385/24 |
| 5,835,646 | A | | 11/1998 | Yoshimura et al. | 385/14 |
| 6,477,286 | B1 | * | 11/2002 | Ouchi | 385/14 |
| 6,621,959 | B1 | * | 9/2003 | Lin et al. | 385/37 |
| 6,661,940 | B1 | * | 12/2003 | Kim | 385/15 |
| 6,810,170 | B1 | * | 10/2004 | Takushima et al. | 385/24 |
| 2004/0151462 | A1 | * | 8/2004 | Furuyama | 385/129 |

FOREIGN PATENT DOCUMENTS

| EP | 0 322 218 | 6/1989 |
|---|---|---|
| JP | 9-96746 | 4/1997 |
| JP | 2000-199827 | 7/2000 |
| WO | WO 01/50164 | 7/2001 |

OTHER PUBLICATIONS

Maeda, et al., "TA 8.5: Toward Multiwave Opto-Electronics For 3-D Parallel Computing", IEEE International Solid-State Circuits Conference, vol. 36, pp. 132-133, Feb. 1993.

* cited by examiner

*Primary Examiner*—Sarah Song
(74) *Attorney, Agent, or Firm*—Fitzpatrick, Cella, Harper & Scinto

(57) ABSTRACT

Optical waveguide apparatus includes a two-dimensional optical waveguide, a light transmitting unit for transmitting light through the optical waveguide, a light receiving unit for receiving light transmitted through the optical waveguide, and a relaying unit for relaying light transmitted through the waveguide from the light transmitting unit at a place between the light transmitting unit and the light receiving unit to transmit the relayed light to the light receiving unit with the apparatus, the arrangement and flexibility of a light emitting device for converting an electrical signal into an optical signal and light receiving device for converting an optical signal into an electrical signal is large, and an optical transmission can be effectively performed.

8 Claims, 18 Drawing Sheets

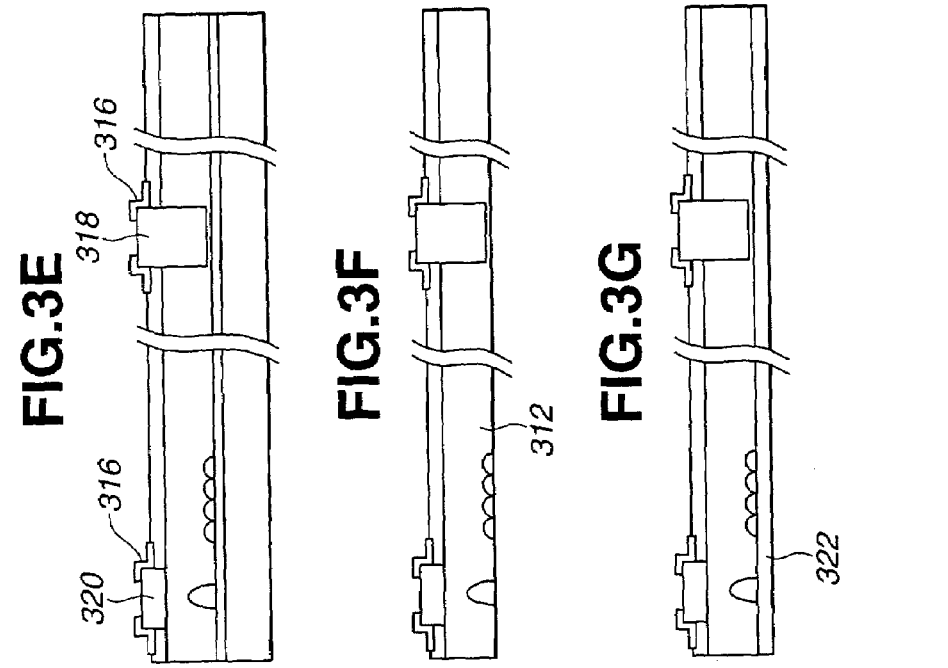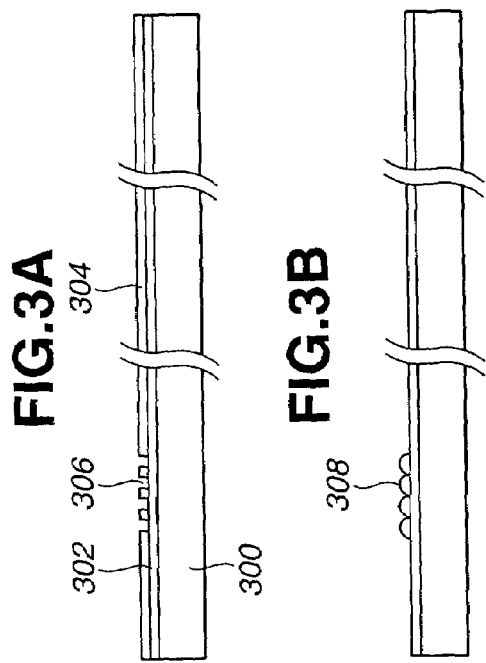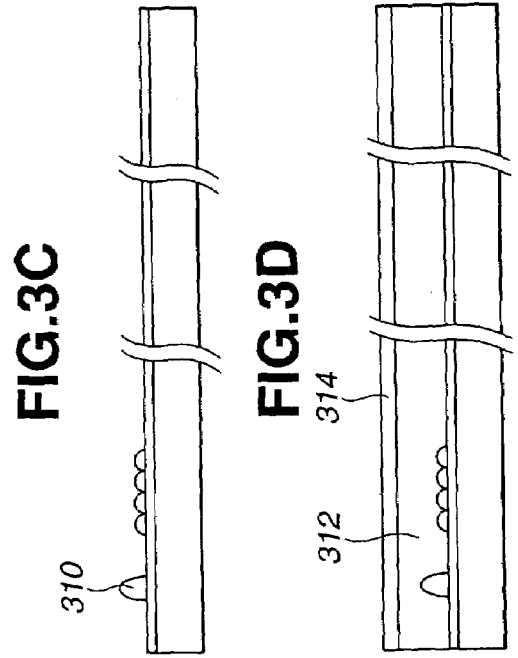

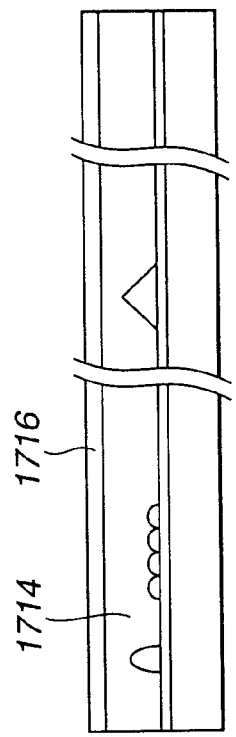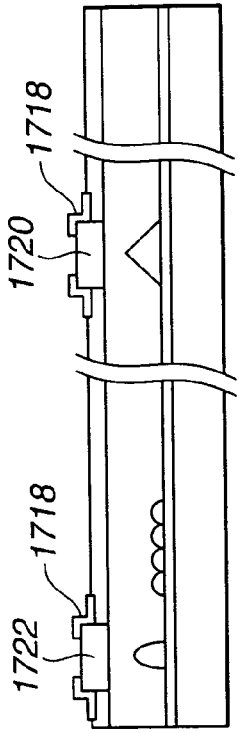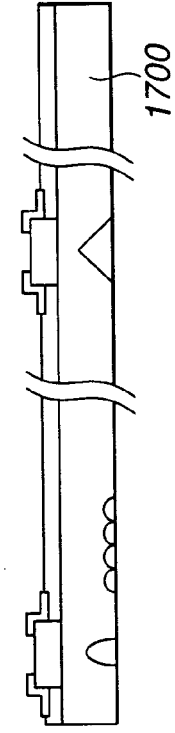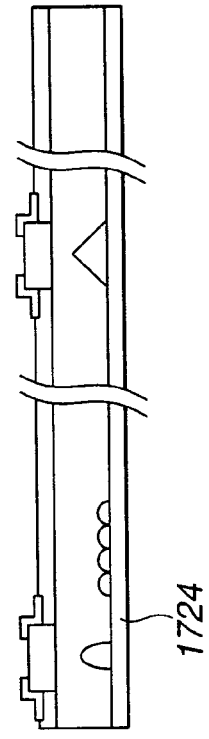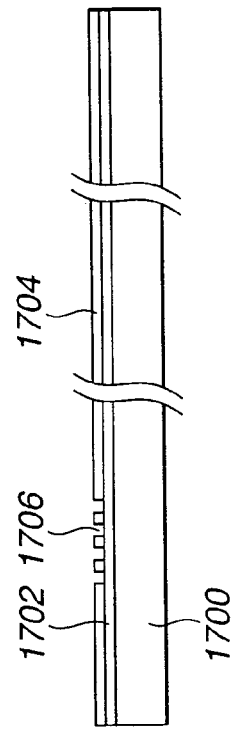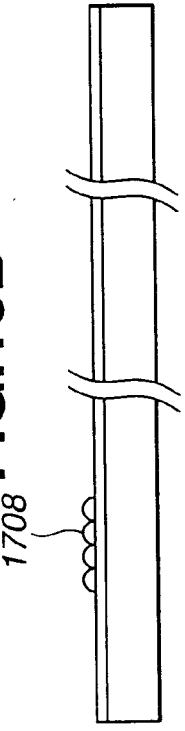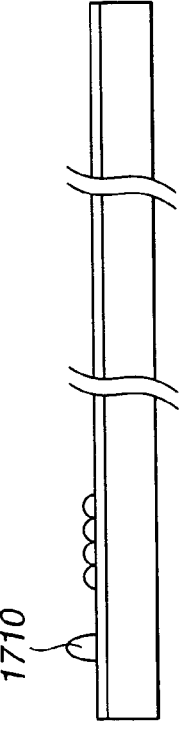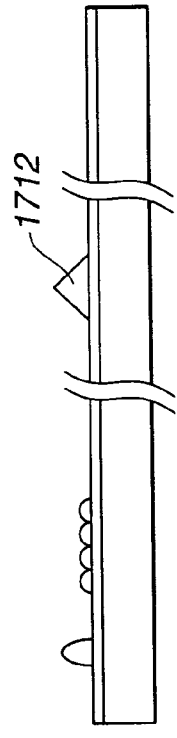

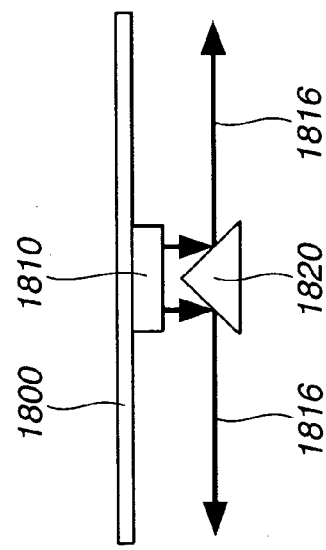
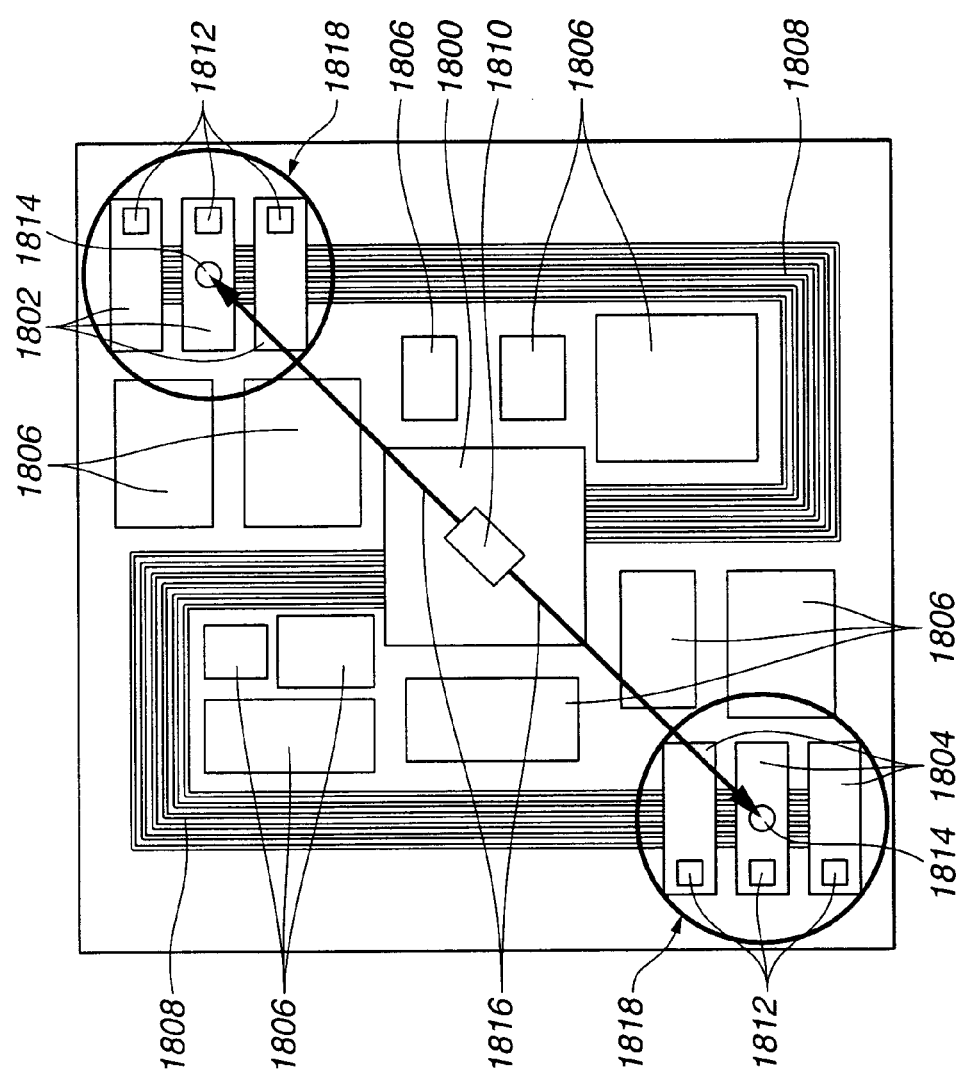
FIG.11B
FIG.11A

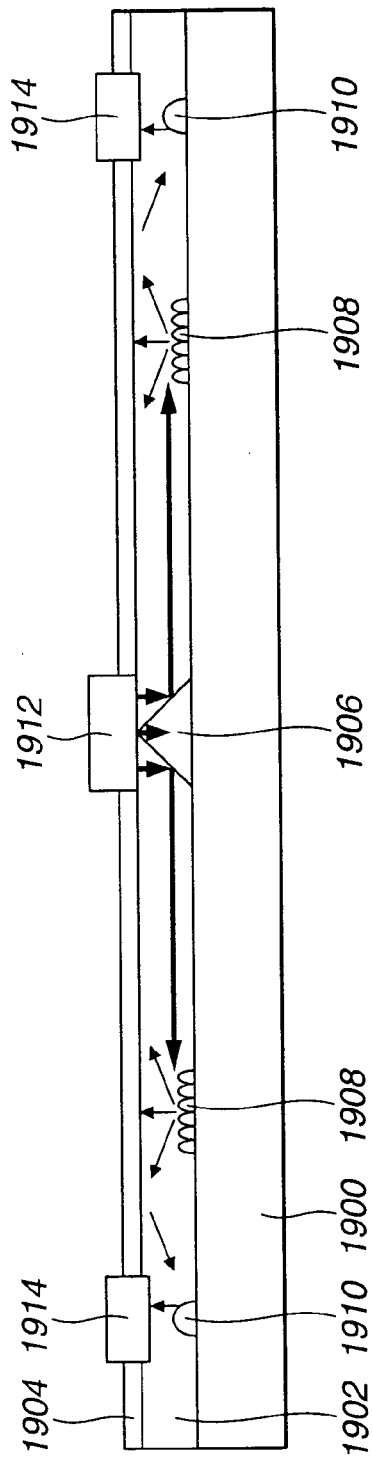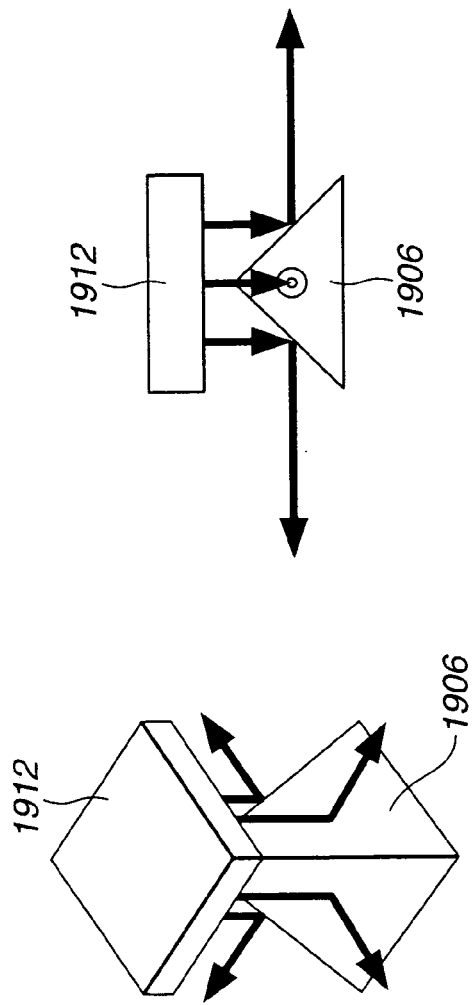

TWO-DIMENSIONAL OPTICAL WAVEGUIDE APPARATUS, AND OPTO-ELECTRONIC HYBRID CIRCUIT BOARD USING SUCH OPTICAL WAVEGUIDE APPARATUS

This application is based on Japanese Patent Application No. 2002-219251 filed Jul. 29, 2002, the entire disclosure of which is incorporated by reference herein.

BACKGROUND OF THE INVENTION

1. Field of the Invention

The present invention relates to a two-dimensional optical waveguide apparatus, and an opto-electronic hybrid circuit board that includes an electronic circuit layer and an optical circuit layer in a hybrid form.

2. Description of the Related Background Art

In recent years, cellular phones and personal digital assistants (PDAs) have been more and more widely used drastically, and equipment with smaller size, lighter weight and higher performance is desired. However, operation speed and integration of electronic circuit boards increase as the size and weight of equipment are reduced and the performance of equipment is enhanced. Accordingly, appropriate and prompt measures are strongly needed to cope with malfunctions of equipment due to signal delay and electromagnetic interference (EMI). In such a situation, the optical circuit or interconnection is expected to radically solve the above technical problems. The optical circuit or interconnection can reduce the EMI radiated from the wiring, and can transmit optical information at high speed.

Japanese Patent Application Laid-Open No. 9(1997)-96746 discloses the following optical circuit board which makes use of the technical advantage of the optical wiring. In this optical circuit board, an optical wiring portion and an electronic wiring portion are separated from each other, optical switches or optical modulators provided on the board are driven by a voltage signal supplied from electronic equipment, and light propagating through optical waveguides provided on the substrate is modulated. The electrical signal is thus converted into an optical signal, and transmitted. The thus-transmitted optical signal is again converted into an electrical signal by a light-receiving device provided on the board, or another board, and the signal is transmitted to another piece of electronic equipment, or the same electronic equipment. In this construction, the electronic wiring is partly replaced by the optical wiring, but places for executing electrical/optical (EO) signal conversion or optical/electrical (OE) signal conversion are limited since the optical wiring path is comprised of a transmission line (i.e., a line-shaped linear polymer waveguide).

Further, Japanese Patent Application Laid-Open No. 2000-199827 discloses an apparatus wherein a 45-degree mirror is used to couple light, which enters or emerges perpendicularly, to the optical waveguide. The 45-degree mirror is thus used to couple light to the waveguide, or couple light transmitted in the waveguide to a light receiving device, and hence the transmission path is inevitably a linear path. Accordingly, when plural transmission paths are to be formed, places where light emitting devices and light receiving devices are situated are limited. Flexibility of board designing is thus small.

SUMMARY OF THE INVENTION

It is an object of the present invention to provide a two-dimensional optical waveguide apparatus which includes relay means for relaying light, transmitted from a light transmission side and propagating in a waveguide, at a place between the light transmission side and a light reception side such that light can be effectively transmitted, and in which arrangement flexibility of a light emitting device for converting an electrical signal into an optical signal and a light receiving device for converting an optical signal into an electrical signal is large. It is another object of the present invention to provide an opto-electronic hybrid circuit board using the two-dimensional optical waveguide apparatus.

According to one aspect of the present invention, there is provided an optical waveguide apparatus that includes a two-dimensional optical waveguide, a light transmitting unit for transmitting light through the optical waveguide, a light receiving unit for receiving light transmitted through the optical waveguide, and a relaying unit for relaying light transmitted through the optical waveguide from the light transmitting unit at a place between the light transmitting unit and the light receiving unit to transmit the relayed light to the light receiving unit. As disclosed herein, the two-dimensional optical waveguide is an optical waveguide that permits, for example, an optical transmission from a light transmitting unit that is not directed at a light receiving unit, as well as an optical transmission from the light transmitting unit to the light receiving unit. According to the above construction, it is possible to make use of various combinations of transmission, such as beam-light transmission and diffused-light transmission, beam-light transmission and beam-light transmission, diffused-light transmission and beam-light transmission, and diffused-light transmission and diffused-light transmission, between the light transmitting unit and the light receiving unit depending on the arrangement relationship between the light transmitting unit and the light receiving unit. The signal transmission can hence be effectively achieved with reduced loss of optical power. Typically, after a light beam is initially transmitted to a place near the light receiving unit, the beam is diffused in all directions to be transmitted to the light receiving unit with high efficiency. When an active relaying unit (described later) is used, it is possible to effectively transmit the optical signal to the light receiving unit even by the combination of diffused-light transmission and diffused-light transmission. Further, two or more relaying units can be used to transmit the optical signal to the light receiving unit.

The following specific structures are possible on the basis of the above fundamental construction.

The relaying unit can be constructed such that a propagation condition of light in a plane of the optical waveguide can be changed at a place on a light propagation path between the light transmitting unit and the light receiving unit in a relaying manner (see, for example, FIG. 8), or such that a propagation condition of light can be changed at a place on a light propagation path between the light transmitting unit and the light receiving unit in a relaying manner between a direction in the plane of the waveguide and a direction approximately perpendicular thereto (see, for example, FIG. 8).

The relaying unit can include a light diffusing structure capable of diffusing a light beam propagating in the form of a beam toward all 360-degree directions, or toward directions of a predetermined angular range in the optical waveguide. In this case, the light diffusing structure is a minute structure having a thickness less than a thickness of a core layer of the optical waveguide, for example (see FIG. 1, etc.). As disclosed herein, the core layer is a layer of a relatively high refractive index in which light propagates. Alternatively, the relaying unit can include a reflective structure capable of changing the propagation direction of a light beam propagating in the form of a beam while maintaining the beam form (see FIG. 6, etc.).

A line-shaped linear optical waveguide capable of transmitting light in its optical axial direction can be formed in a portion of the optical waveguide capable of transmitting light in two-dimensional directions. Loss of optical power can be further reduced when such a linear optical waveguide is used for optical transmission.

The relaying unit can include an optical structure, such as a grating, a hologram, a roughed-surface structure, and a minute-protrusion structure, capable of changing a propagation condition of light propagating in the optical waveguide in a passive manner. The passive manner is a manner in which the optical signal is not processed in a regenerative manner by amplification, shaping, etc. Alternatively, the relaying unit can include a light receiving device for receiving the propagating light to convert it into an electrical signal (O/E conversion), and a light emitting device for reconverting the electrical signal obtained by the O/E conversion into another optical signal (E/O conversion) such that a propagation condition of light propagating in the optical waveguide can be actively changed. The active manner is a manner in which the optical signal is processed in a regenerative manner by amplification, shaping, etc. Those relaying units can be selectively employed as occasion demands.

The optical waveguide can have a structure in which a sheet-shaped core layer is sandwiched by a first cladding layer and a second cladding layer. As disclosed herein, the cladding layer is a layer of a relatively low refractive index adjacent to a layer of a relatively high refractive index. At least one of a light emitting device in the light transmitting unit and a light receiving device in the light receiving unit is typically arranged on a surface of the optical waveguide, or in the optical waveguide though arrangement locations thereof are not restricted.

An optical-path converting structure for converting at least one light beam emitted from the light emitting device into at least one light beam propagating in at least one predetermined direction can be disposed in a portion of the optical waveguide below the light emitting device. The optical-path converting structure has a spherical, hemispherical, conical, wedge-shaped, or polygonal pyramid-shaped structure, for example.

The light emitting device can be a single vertical cavity surface emitting laser (VCSEL), or an arrayed-type VCSEL, which is arranged such that light from the VCSEL can be coupled to a slant face or slant faces of the optical-path converting structure. The arrayed type is a type in which a plurality of devices are arrayed in an assembled form. When light emission ports of the arrayed-type VCSEL are aligned with slant faces of the optical-path converting structure, the light beam can be transmitted in any desired direction with high efficiency. At least one of the light emitting device and the light receiving device can be a spherical optical device. Electronic device can be integrally formed on a surface of the spherical optical device.

According to another aspect of the present invention, there is provided an opto-electronic hybrid circuit board that includes the above-discussed optical waveguide apparatus of the present invention, and an electronic circuit layer which is electrically connected to the optical waveguide apparatus. Part or all of signals in the electronic circuit layer can be distributed by transmission and reception of the optical signal using the optical waveguide apparatus to operate electronic equipment.

The following more specific structures are possible. Plural vias can be formed in the optical waveguide apparatus. The via penetrates the optical waveguide apparatus such that electronic circuit layers sandwiching the optical waveguide apparatus can be electrically connected to each other. Serial optical signals, can be transmitted in the optical waveguide apparatus in a construction in which the electronic circuit layer includes parallel signal lines, output terminals of the parallel signal lines are connected to the spherical light emitting device, and the electronic device integrally formed in the spherical light emitting device performs parallel/serial conversion. In this case, parallel electrical signals can be transmitted to an electronic device, when the serial optical signal is received by the spherical light receiving device formed in the optical waveguide apparatus, and the electronic device integrally formed in the spherical light receiving device performs serial/parallel conversion.

In the electronic circuit layer, a plurality of optical through-holes penetrating the electronic circuit layer can be formed such that optical signals can be transmitted between two-dimensional optical waveguide apparatuses. The optical through-hole can be filled with the same material as that of the core layer of the two-dimensional waveguide layer apparatus, but the material is not limited thereto. The inner portion of the optical through-hole can be air without using any material, or an optical fiber or a lens can be inserted into the inner portion of the optical through-hole.

These advantages, as well as others, will be more readily understood in connection with the following detailed description of the preferred embodiments and examples of the invention in connection with the drawings.

BRIEF DESCRIPTION OF THE DRAWINGS

FIGS. 3A through 3G are cross-sectional views illustrating a method for making the first embodiment.

FIGS. 10A through 10H are cross-sectional views illustrating a method for making the fifth embodiment.

FIGS. 11A and 11B are views illustrating the fifth embodiment of an opto-electronic hybrid circuit board that includes a two-dimensional optical waveguide apparatus and an electrical circuit board in a hybrid form.

FIGS. 12A and 12B are views illustrating a sixth embodiment of a two-dimensional optical waveguide apparatus according to the present invention.

DESCRIPTION OF THE PREFERRED EMBODIMENTS

Embodiments of an optical waveguide apparatus and an opto-electronic hybrid circuit board of the present invention will be described with reference to FIGS. 1 through 18.

Figure 1:
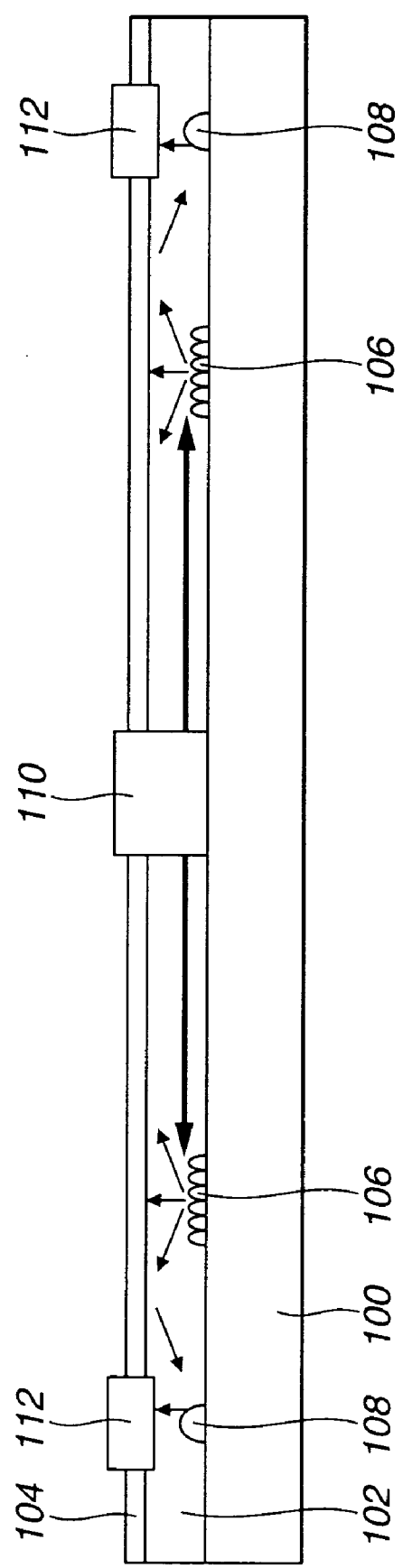
FIG. 1 is a cross-sectional view illustrating a first embodiment of a two-dimensional optical waveguide apparatus according to the present invention.

FIG. 1 illustrates a portion of an optical waveguide apparatus of a first embodiment according to the present invention. In FIG. 1, reference numeral 100 designates a first cladding layer. Reference numeral 102 designates a core layer. Reference numeral 104 designates a second cladding layer. Reference numeral 106 designates a light diffusing structure comprised of a plurality of minute protrusions. Reference numeral 108 designates an optical-path converting structure for changing an optical path of propagating light. Reference numeral 110 designates a light emitting device. Reference numeral 112 designates a light receiving device.

A two-dimensional sheet-shaped optical waveguide is comprised of the core layer 102 (a portion having a relatively large refractive index) and the first and second cladding layers 100 and 104 (portions having relatively small refractive indexes) sandwiching the core layer 102. In the first embodiment, the core layer 102 has a thickness of 100 microns, and is formed of polycarbonate Z (PCZ) (name of product by Mitsubishi Gas Chemical Company Inc.) having a refractive index 1.59. The first cladding layer 100 is a glass substrate having a refractive index 1.53. The second cladding layer 104 has a thickness of 50 microns, and is formed of ARTON (name of product by JSR Corporation) having a refractive index 1.53.

Materials of the core layer 102, and the first and second cladding layers 100 and 104 are not limited to those described above. Polyimide resin, acrylic resin, and the like can also be used if the refractive index of the core material is larger than those of materials of the first and second cladding layers. Further, thicknesses of the core layer 102, and the first and second cladding layers 100 and 104 are also not limited to those described above. For example, the glass substrate can be replaced by a resin film to form a two-dimensional optical waveguide whose entire thickness is about several hundred microns. A bendable and flexible two-dimensional optical waveguide can thus be constructed.

In the first embodiment, an edge-emitting semiconductor laser is used as the light emitting device 110, and this laser is filled in the two-dimensional optical waveguide. As illustrated in FIG. 1, the semiconductor laser 110 can emit two light beams into the two-dimensional optical waveguide. The semiconductor laser 110 is aligned such that those two light beams can be coupled to the light diffusing structures 106 formed in a portion of the two-dimensional optical waveguide, and the semiconductor laser 110 is brought into contact with electrodes formed on the surface of the two-dimensional optical waveguide to be driven. The light beam from the light emitting device 110 is hence diffused in all 360-degree directions by the light diffusing structure 106, and is transmitted overall the entire two-dimensional optical waveguide. Such light is reflected upward in the two-dimensional optical waveguide by the optical-path converting structure 108, and is coupled to the light receiving device 112.

In the first embodiment, although the semiconductor laser capable of emitting two light beams is used, but the light emitting device is not limited thereto. A semiconductor laser capable of emitting a single light beam can be likewise used. Further, a semiconductor laser capable of emitting a multiplicity of light beams and having a ring resonator can be used. In this case, signals can be transmitted overall the entire two-dimensional optical waveguide with higher efficiency.

Figure 2:
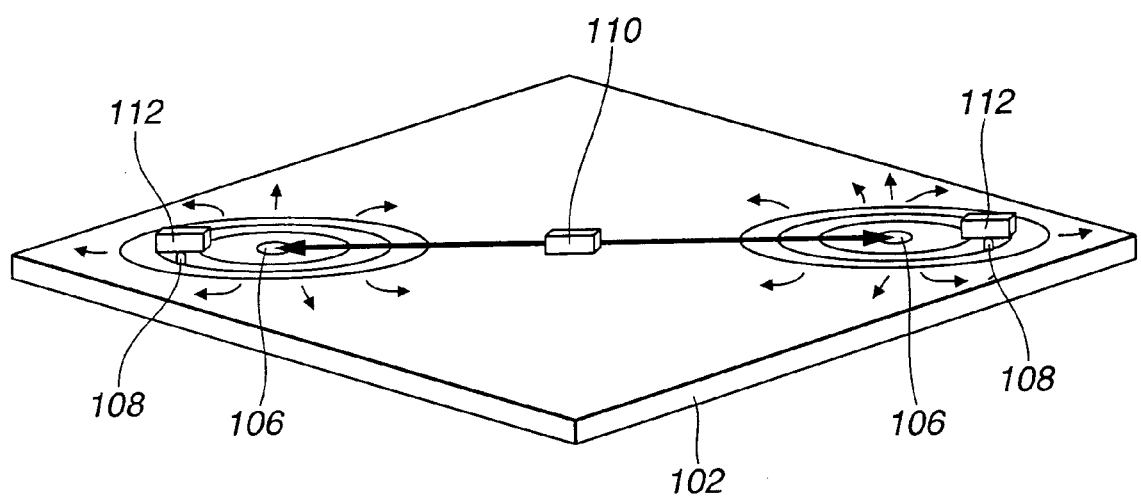
FIG. 2 is a schematic perspective view illustrating the first embodiment.

FIG. 2 illustrates the entire two-dimensional optical waveguide apparatus. The two-dimensional optical waveguide apparatus includes the two-dimensional optical waveguide, the light emitting device 110 and light receiving device 112 arranged in any desired locations, the light diffusing structure 106 for diffusing a light beam from the light emitting device, and the optical-path converting structure 108 for converting the optical path of the diffused light. In such a structure, the optical signal emitted from the light emitting device 110 is initially transmitted as a light beam to a place near the light receiving device 112, and is then diffused in all directions by the light diffusing structure 106. Therefore, the optical signal can be transmitted to the light receiving device 112 disposed at any desired place with small loss of optical power and high efficiency.

A fabrication method of the two-dimensional optical waveguide apparatus of the first embodiment will be described with reference to FIGS. 3A through 3G. In FIGS. 3A through 3G, reference numeral 300 designates a glass substrate. Reference numeral 302 designates an electrode provided on the entire surface for electroplating. Reference numeral 304 designates a photoresist. Reference numeral 306 designates a window formed for electroplating. Reference numeral 308 designates a light diffusing structure. Reference numeral 310 designates an optical-path converting structure for changing an optical path of propagating light. Reference numeral 314 designates a second cladding layer. Reference numeral 316 designates an electrode wiring. Reference numeral 318 designates a semiconductor laser. Reference numeral 320 designates a light receiving device. Reference numeral 322 designates a first cladding layer. The two-dimensional optical waveguide apparatus fabricated by fabrication steps of FIGS. 3A through 3G differs from the structure illustrated in FIG. 1 in a portion of the first cladding layer.

Initially, Cr/Au (Cr layer and Au layer) 302 is vacuum-evaporated on the glass substrate 300 as the entire electrode for electroplating, as illustrated in FIG. 3A. The photoresist 304 is then patterned by photolithography to form the electrode-exposing window 306 for electroplating at any desired location at which the light diffusing structure 308 is to be provided. For example, a plurality of minute circular windows are formed in a close form. Then, as illustrated in FIG. 3B, Ni electroplating is performed such that a plated structure formed around each window 306 can be an approximately hemispherical structure having a radius of 30 microns. The light diffusing structure 308 appears when the photoresist 304 is removed.

Then, as illustrated in FIG. 3C, using a method similar to the method of forming the light diffusing structure 308, the optical-path converting structure 310 having a hemispherical profile with a radius of 75 microns is formed at any desired location at which diffused light is to be deflected upward. As illustrated in FIG. 3D, a polycarbonate resin of a relatively large refractive index is then coated on the glass substrate 300, and is cured to form the core layer 312 having a thickness of 100 microns. After that, ARTON having a refractive index smaller than that of the core layer 312 is coated, and is likewise cured to form the second cladding layer 314.

Electrodes and electrical wires 316 are formed on the second cladding layer 314 as illustrated in FIG. 3E. Here, a hole for situating the semiconductor laser 318 is formed by laser processing. When the semiconductor laser 318 is settled in the hole, a light beam therefrom can be coupled to the light diffusing structure 308. At the same time, a hole for situating the light receiving device 320 is formed above the optical-path converting structure 310 in alignment therewith. The semiconductor laser 318 and the light receiving device 320 are settled in the respective holes using a flip-chip bonder. Then, as illustrated in FIG. 3F, a portion above the core layer 312 is removed from the glass substrate 300. Where necessary, the removed portion including the core layer 312 is bonded on the first cladding layer 322 having a refractive index smaller than that of the core layer 312. A bendable and flexible two-dimensional optical waveguide apparatus can be obtained when an ARTON film, or the like is used as the first cladding layer 322. The first and second cladding layers need not be necessarily used.

Figure 4:
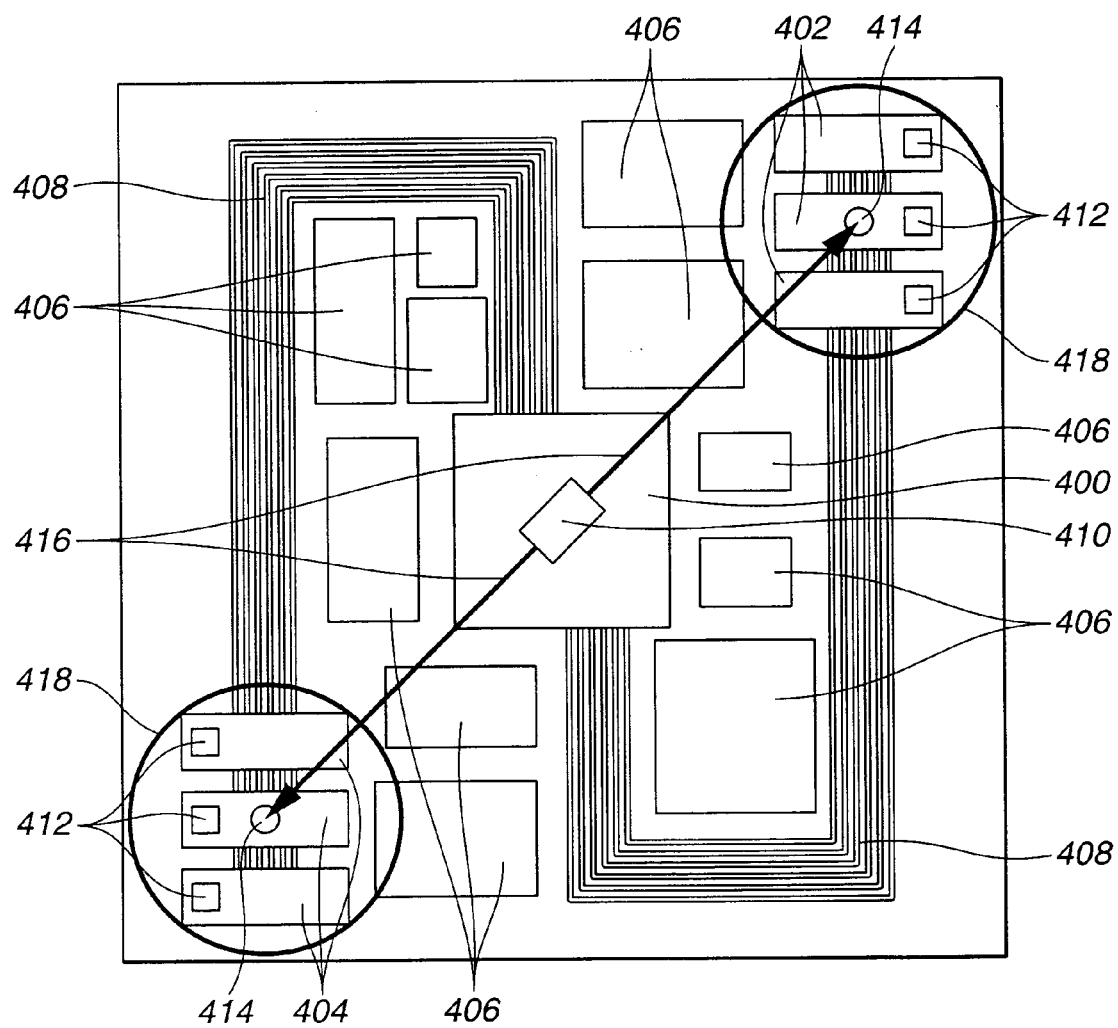
FIG. 4 is a schematic plan view illustrating an embodiment of an opto-electronic hybrid circuit board using the two-dimensional optical waveguide apparatus of the first embodiment.

FIG. 4 illustrates an opto-electronic hybrid circuit board which is fabricated by combining the above-discussed two-dimensional optical waveguide apparatus with an electronic circuit board. In FIG. 4, reference numeral 400 designates a central processing unit (CPU). Reference numerals 402 and 404 designate random access memories (RAMs), respectively. Reference numeral 406 designates an electronic device other than the CPU and RAM. Reference numeral 408 designates an electrical transmission line. Reference numeral 410 designates a light emitting device. Reference numeral 412 designates a light receiving device. Reference numeral 414 designates a light diffusing structure. Reference numeral 416 designates a light beam, and reference numeral 418 designates diffused light.

No adverse influence of EMI occurs in low-speed data transmission, but adverse influence of EMI increases in the conventional electronic circuit when high-speed transmission with large capacity is needed. It is hence difficult to stably perform data transmission at all times. In such a case, stable high-speed transmission with large capacity can be achieved when the opto-electronic hybrid circuit board as illustrated in FIG. 4 is employed.

In the opto-electronic hybrid circuit board of FIG. 4, parallel/serial conversion is executed at the last stage of the CPU 400, and a single semiconductor laser 410 connected to the CPU 400 is used to convert an electrical signal to an optical signal, in contrast to the conventional electronic circuit which needs multiple transmission lines. This semiconductor laser 410 is filled in the two-dimensional optical waveguide apparatus such that the light beam 416 therefrom can propagate in the two-dimensional optical waveguide apparatus with a high directivity, and the light beam is diffused by the light diffusing structure 414 in its optical path. The diffused light 418 spreads overall the two-dimensional optical waveguide, and the optical signal is received by the light receiving device 412 placed at any desired location. The light receiving device 412 is electrically connected to the RAM 404, and the optical signal is converted into an electrical signal thereby. This electrical signal is then serial/parallel converted to the parallel signal with 64-bit wide.

There is necessarily no need of transmitting the signal by light. Selective flexibility of transmission is established in the above-discussed apparatus such that the signal can be transmitted through the electronic circuit as well. A device for controlling a bus of the apparatus determines which of optical circuit and electronic circuit is used to transmit the signal.

In conventional signal lines, the wiring itself forms an antenna, and a malfunction of the circuit is caused due to the common-mode noise radiation. In the construction using the optical circuit, electromagnetic radiation noises causing such problem can be vastly reduced, and the EMI can be solved.

Further, in this embodiment, a light beam is used for transmission in a region where no signal transmission is needed, and light is diffused or spread in a region where the signal is needed. Therefore, loss of optical power can be reduced in this embodiment, as compared with a case where an optical signal is two-dimensionally diffused from the beginning, and transmitted.

In a portion of the two-dimensional slab optical waveguide layer for transmitting light, a line-shaped waveguide with a lateral optical confinement structure can be formed such that the light beam can be transmitted to a place of the light diffusing structure 414 with still smaller power loss. The line-shaped optical waveguide can be formed, for example, as follows. In the case of polycarbonate Z, monochlorobenzene solution of polycarbonate Z and photopolymerization monomer is coated, and the coated material is then exposed to radiation through a photo mask having a pattern of the line-shaped optical waveguide. Polymerization occurs only in the exposed region. Non-reacted monomer is then removed. Thus, the line-shaped optical waveguide of polycarbonate Z is formed. The line-shaped optical waveguide can also be formed by a method in which a heated mold is pressed against an optical waveguide sheet to form a patterned indented surface. Thus, a convex line of the line-shaped optical waveguide is produced.

Figure 5:
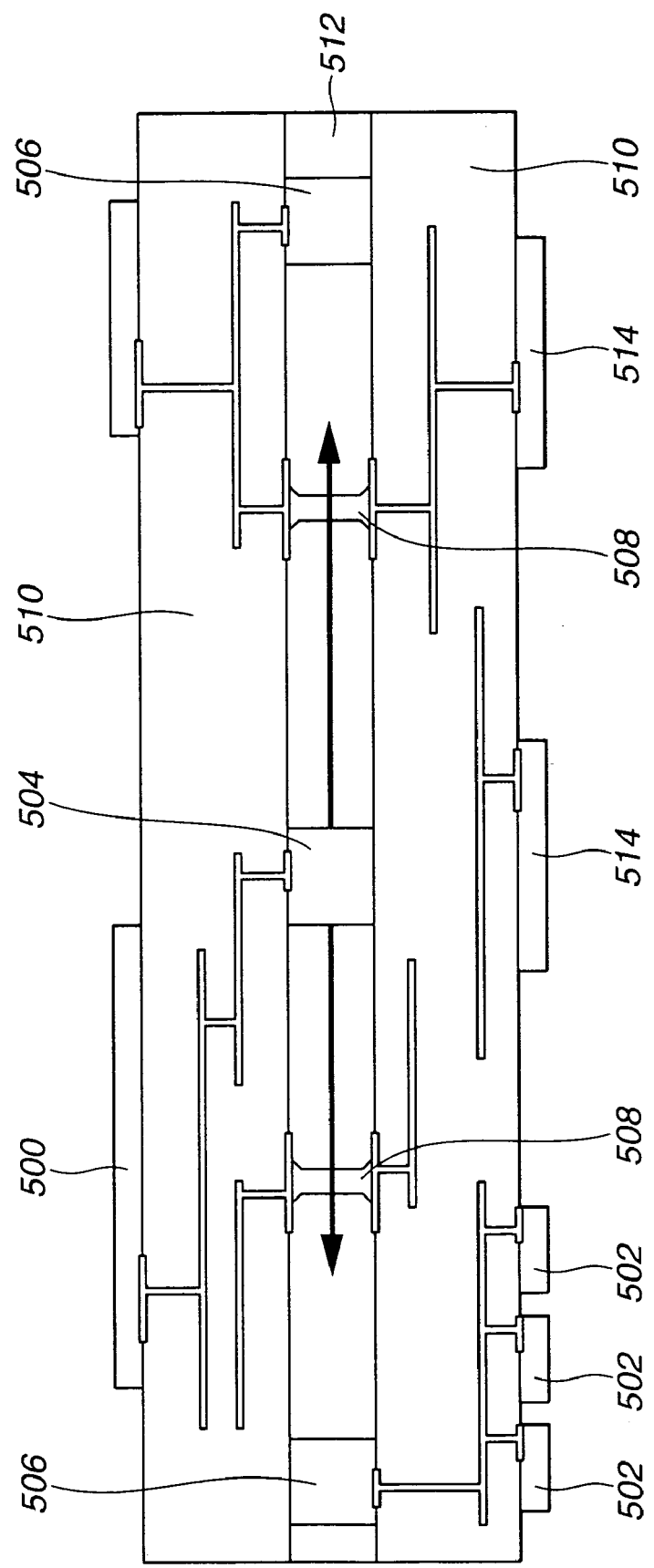
FIG. 5 is a cross-sectional view illustrating a second embodiment of an opto-electronic hybrid circuit board according to the present invention.

FIG. 5 illustrates a cross section of an opto-electronic hybrid circuit board of a second embodiment in which an optical circuit layer is sandwiched by electronic circuit boards. In FIG. 5, reference numeral 500 designates a CPU. Reference numeral 502 designates a RAM. Reference numeral 504 designates a light emitting device. Reference numeral 506 designates a light receiving device. Reference numeral 508 designates a via. Reference numeral 510 designates an electronic circuit layer. Reference numeral 512 designates an optical wiring layer. Reference numeral 514 designates an electronic device.

As illustrated in FIG. 5, two electronic circuit layers 510 are electrically connected through the via 508 with the optical circuit layer 512 being interposed. Here, when a signal from the CPU 500 is transmitted to the RAM 502 as an optical signal, for example, there is a possibility that the via 508 situated in the optical circuit layer 512 may act as an obstacle for transmission of the optical signal. In the second embodiment, therefore, the signal is transmitted as a light beam that propagates avoiding the via 508. When necessary, the light beam is diffused to transmit the signal.

When the above-noted optical circuit is used, transmission can be performed by the optical signal even in the case where an obstacle exists in the optical circuit layer 512. Loss of optical power can be reduced, as compared with a case where an optical signal is two-dimensionally diffused from the beginning, and transmitted. Further, where the optical signal is transmitted to a location relatively remote from the light emitting device, it is preferable to employ a transmission method in which the signal is transmitted as a light beam up to a place at a predetermined distance from the light emitting device, and then diffused for transmission. Loss of optical power can be reduced in such a transmission method, as compared with a case where light is diffused from the beginning.

Figure 6:
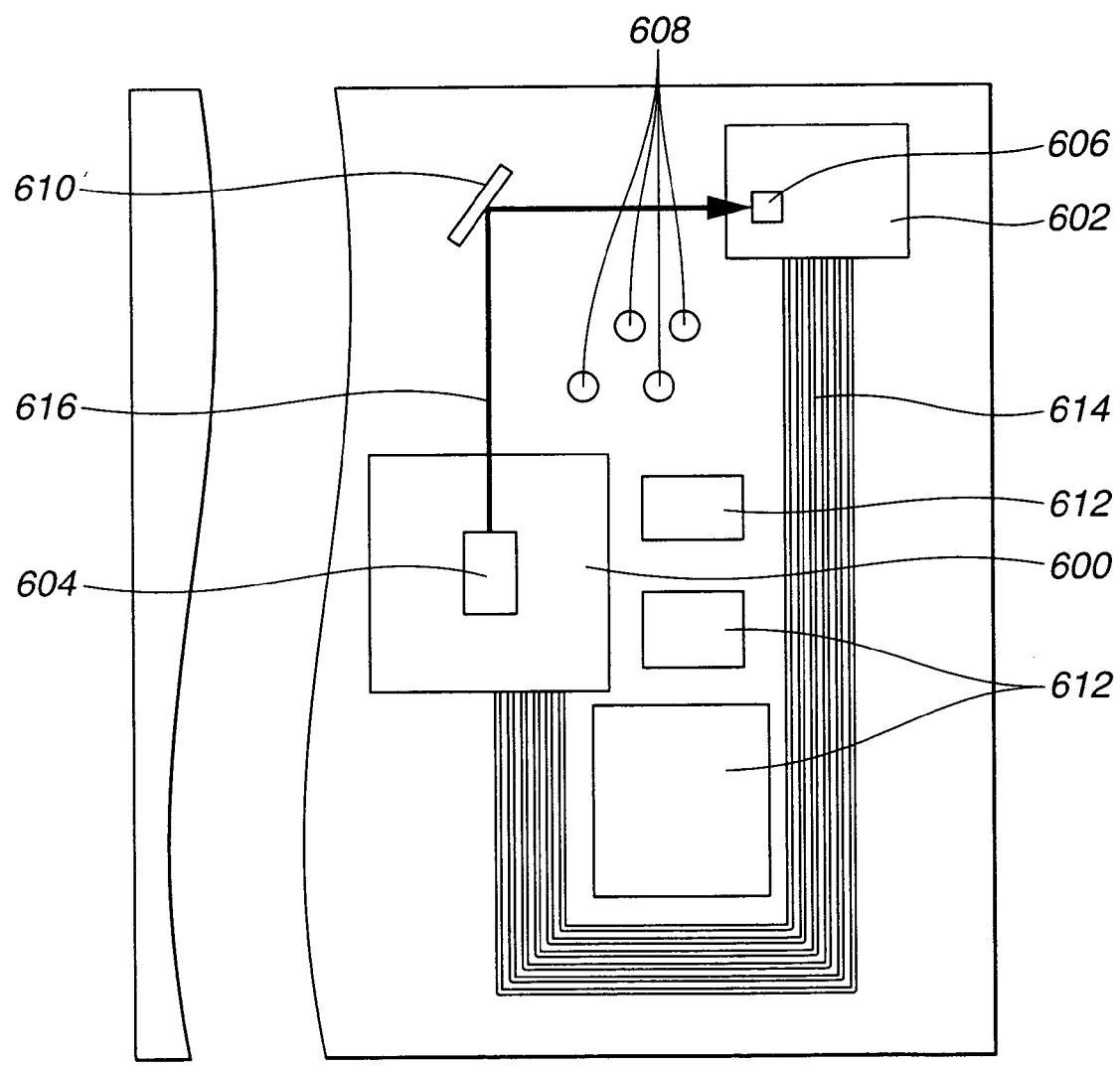
FIG. 6 is a schematic plan view illustrating a third embodiment of an opto-electronic hybrid circuit board according to the present invention.

FIG. 6 is a plan view illustrating an opto-electronic hybrid circuit board of a third embodiment in which an optical circuit layer is sandwiched by electronic circuit boards. In FIG. 6, reference numeral 600 designates a CPU. Reference numeral 602 designates a RAM. Reference numeral 604 designates a light emitting device. Reference numeral 606 designates a light receiving device. Reference numeral 608 designates a via. Reference numeral 610 designates a reflective mirror. Reference numeral 612 designates an electronic device. Reference numeral 614 designates an electrical transmission line. Reference numeral 616 designates a light beam.

Also in the third embodiment, like the second embodiment, when the signal from the CPU 600 is transmitted to the RAM 602 as an optical signal, for example, there is a possibility that the via 608 situated in the optical circuit layer may act as an obstacle for transmission of the optical signal. In the third embodiment, therefore, the signal is transmitted as the light beam 616 that propagates avoiding the via 608, and the light beam 616 is deflected by a structure, which serves as the mirror 610, and is disposed at an appropriate location in the optical circuit layer. The optical signal can thus be transmitted avoiding the obstacle and reducing loss of optical power.

In FIG. 6, one mirror 610 is illustrated, but a plurality of mirrors can be used. Further, the transmitted light beam 616 can be diffused by a light diffusing structure, and is transmitted, when necessary.

Figure 7:
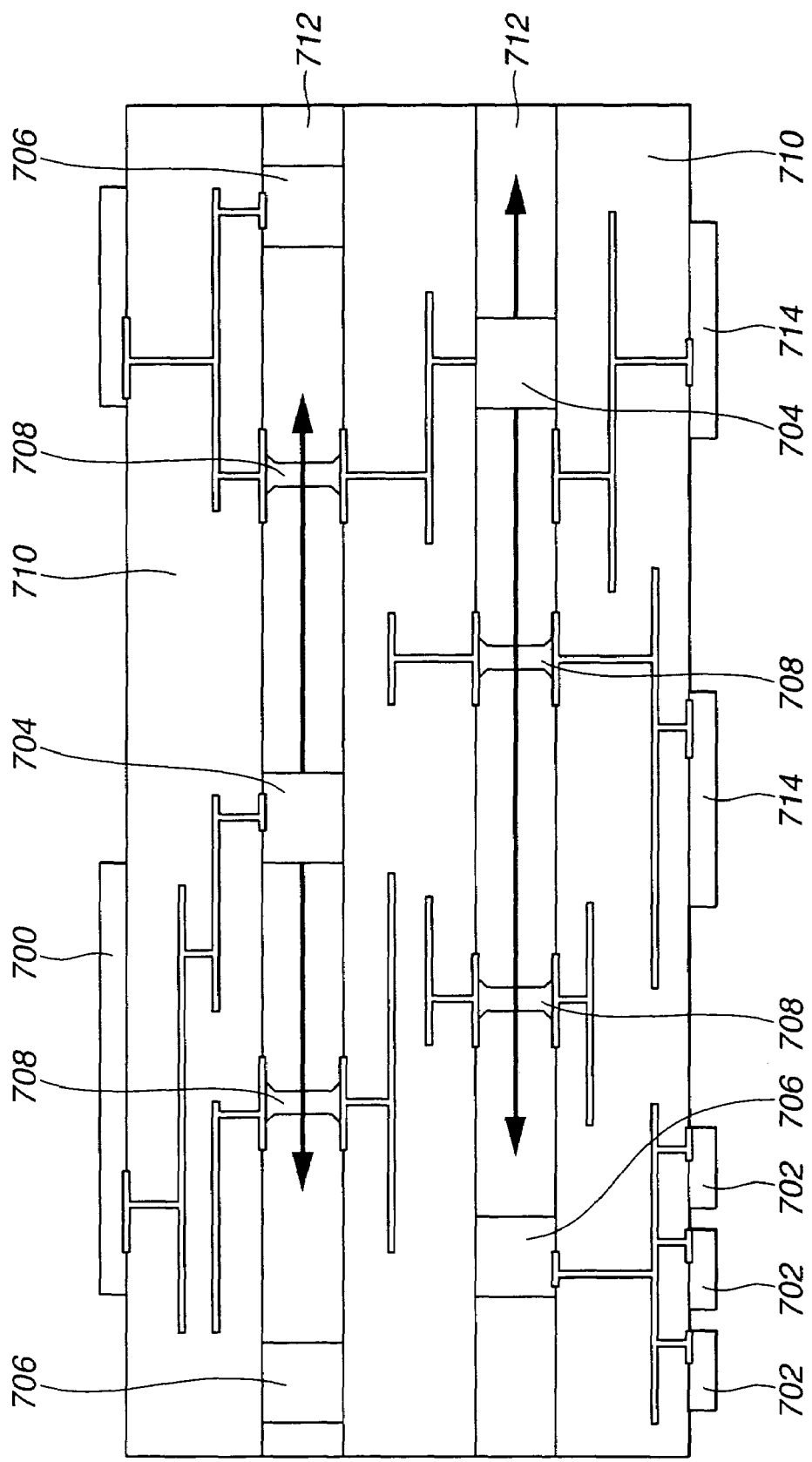
FIG. 7 is a cross-sectional view illustrating a fourth embodiment of an opto-electronic hybrid circuit board according to the present invention.

FIG. 7 illustrates a cross-section of an opto-electronic hybrid circuit board of a fourth embodiment in which a plurality of optical circuit layers are used. In FIG. 7, reference numeral 700 designates a CPU. Reference numeral 702 designates a RAM. Reference numeral 704 designates a light emitting device. Reference numeral 706 designates a light receiving device. Reference numeral 708 designates a via. Reference numeral 710 designates an electronic circuit layer. Reference numeral 712 designates an optical circuit layer. Reference numeral 714 designates an electronic device.

Plural electronic circuit layers can be simultaneously used in an opto-electronic hybrid circuit board including plural optical circuit layers as in the fourth embodiment. Although two optical circuit layers 712 are used in this embodiment, the number thereof is not limited to two. Further, the electronic circuit layers 710 and the optical circuit layers 712 are alternately layered in FIG. 7, but the layer structure is not limited to this alternate layering structure. It is also possible to insert cladding layers or the like such that the optical signal propagating in the optical circuit layer can be prevented from propagating into another optical circuit layer, and plural optical circuit layers can be layered without the electronic circuit layer being interposed therebetween.

Figure 8:
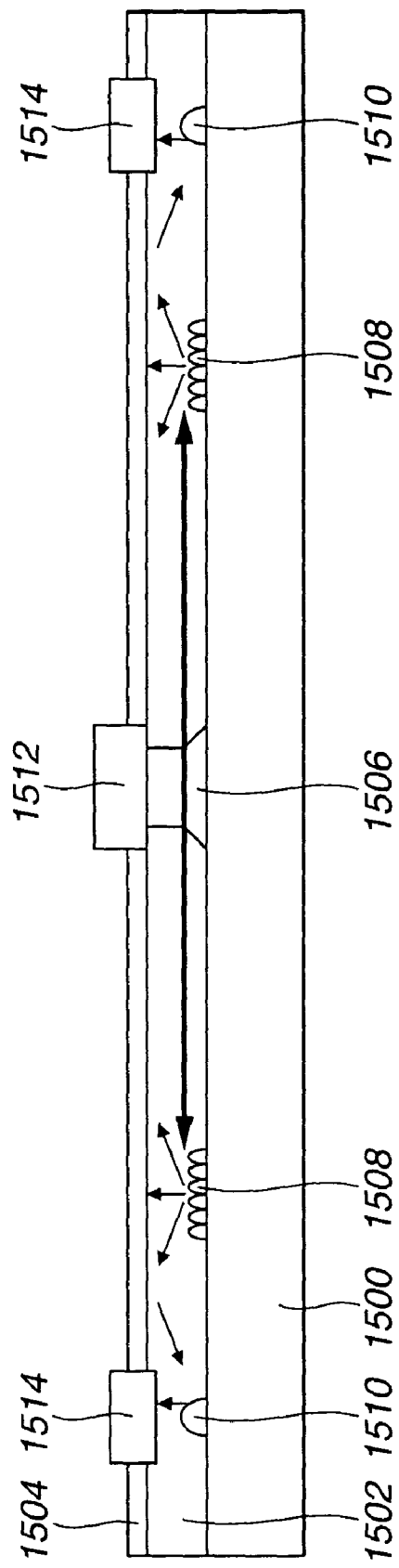
FIG. 8 is a cross-sectional view illustrating a fifth embodiment of an opto-electronic hybrid circuit board according to the present invention.

FIG. 8 illustrates a portion of a two-dimensional optical waveguide apparatus of a fifth embodiment according to the present invention. In FIG. 8, reference numeral 1500 designates a first cladding layer. Reference numeral 1502 designates a core layer. Reference numeral 1504 designates a second cladding layer. Reference numeral 1506 designates a first optical-path converting structure. Reference numeral 1508 designates a light diffusing structure. Reference numeral 1510 designates a second optical-path converting structure. Reference numeral 1512 designates a light emitting device. Reference numeral 1514 designates a light receiving device. A two-dimensional sheet-shaped optical waveguide similar to that of the first embodiment is used.

In the fifth embodiment, the first quadruple pyramid-shaped optical-path converting structure 1506 is formed immediately below the light emitting device 1512 such that a light beam emitted by the light emitting device 1512 can be transmitted in the form of one or more light beams toward desired directions. The light emitting device 1512, such as a semiconductor laser, is aligned such that light emitted thereby can be coupled to the first optical-path converting structure 1506, and be split into four beams in four directions. Further, the first optical-path converting structure 1506 is so arranged that each split light beam can be coupled to the light diffusing structure 1508 situated at an appropriate location in the two-dimensional optical waveguide. Each light beam is thus diffused by the light diffusing structure 1508 in 360-degree directions, or in regional directions. The light beam can be transmitted as it is such that the light can be deflected by the mirror.

Light propagating in the two-dimensional optical waveguide is reflected upward by the second optical-path converting structure 1510 formed in the two-dimensional optical waveguide, and is coupled to the light receiving device 1514. In the fifth embodiment, the quadruple pyramid-shaped structure is used as the first optical-path converting structure 1506, but it can be a wedge-shaped structure, or a polygonal pyramid-shaped structure capable of splitting a light beam into plural directions. The second optical-path converting structure 1510 can likewise have a structure similar to that the first optical-path converting structure 1506. Further, the second optical-path converting structure is not necessarily needed.

Figure 9:
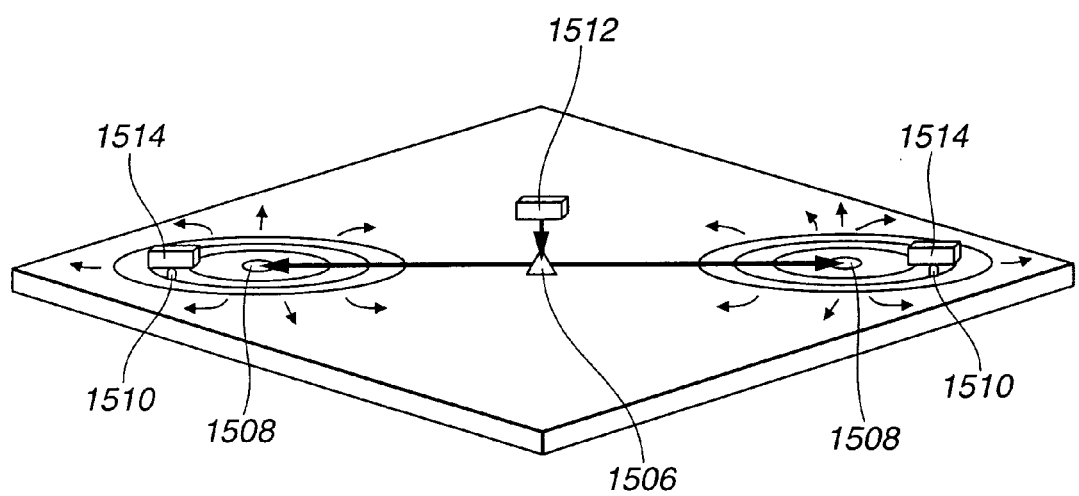
FIG. 9 is a schematic perspective view illustrating the fifth embodiment.

FIG. 9 illustrates the entire two-dimensional optical waveguide apparatus of this embodiment. Here, only two light beams are illustrated out of light beams emitted from the light emitting device 1512 and split in four directions. The two-dimensional optical waveguide apparatus includes the two-dimensional optical waveguide, the light emitting device 1512 and light receiving device 1514 disposed in any desired locations, the light diffusing structure 1508 for diffusing a light beam from the light emitting device 1512, and the minute structure 1510 for converting the optical path of the diffused light. In such a structure, the optical signal emitted from the light emitting device 1512 can be effectively transmitted to the light receiving device 1514 disposed in any desired location.

A fabrication method of the two-dimensional optical waveguide apparatus of the fifth embodiment will be described with reference to FIGS. 10A through 10H. In FIGS. 10A through 10H, reference numeral 1700 designates a glass substrate. Reference numeral 1702 designates an electrode provided on the entire surface for electroplating. Reference numeral 1704 designates a photoresist. Reference numeral 1706 designates a window formed for electroplating. Reference numeral 1708 designates a light diffusing structure. Reference numeral 1710 designates a second optical-path converting structure. Reference numeral 1712 designates a first optical-path converting structure. Reference numeral 1714 designates a core layer. Reference numeral 1716 designates a second cladding layer. Reference numeral 1718 designates an electrode wiring. Reference numeral 1720 designates a semiconductor laser. Reference numeral 1722 designates a light receiving device. Reference numeral 1724 designates a first cladding layer.

The fabrication method of the two-dimensional optical waveguide apparatus of the fifth embodiment is almost the same as that of the first embodiment illustrated in FIGS. 3A to 3G. The former method differs from the latter method in that the first quadruple pyramid-shaped optical-path converting structure 1712 is formed by using a mold fabricated utilizing the Si(111) face, and is placed on the electrode 1702 as illustrated in FIG. 10D.

FIG. 11A illustrates an opto-electronic hybrid circuit board which is fabricated by combining the above-discussed two-dimensional optical waveguide apparatus with an electronic circuit board. FIG. 11B illustrates the neighborhood of a portion for emitting an optical signal. In FIGS. 11A and 11B, reference numeral 1800 designates a CPU. Reference numerals 1802 and 1804 designate RAMs, respectively. Reference numeral 1806 designates an electronic device other than those CPU and RAM. Reference numeral 1808 designates an electrical transmission line. Reference numeral 1810 designates a light emitting device. Reference numeral 1812 designates a light receiving device. Reference numeral 1814 designates a light diffusing structure. Reference numeral 1816 designates a light beam, and reference numeral 1818 designates diffused light. Reference numeral 1820 designates a first optical-path converting structure.

Also in the fifth embodiment, like the first embodiment, electromagnetic radiation noises causing malfunction of the circuit due to the common-mode noise radiation can be remarkably reduced, and the EMI can be solved.

Further, also in this embodiment, a light beam can be used for transmission in a region where no signal transmission is needed, and light can be diffused or spread in a region where the signal is needed. Therefore, loss of optical power can be reduced, as compared with a case where an optical signal is two-dimensionally diffused from the beginning, and transmitted.

FIG. 12A illustrates a cross section of an opto-electronic hybrid circuit board of a sixth embodiment in which an arrayed-type VCSEL with four light emission ports and a first optical-path converting structure are so arranged that four light beams emitted from a light emitting device can be coupled to four side slant faces of a first quadruple pyramid-shaped optical-path converting structure, respectively. FIG. 12B is an enlarged view illustrating the positional relationship between the light emitting device and the first optical-path converting structure. In FIGS. 12A and 12B, reference numeral 1900 designates a first cladding layer. Reference numeral 1902 designates a core layer. Reference numeral 1904 designates a second cladding layer. Reference numeral 1906 designates a first optical-path converting structure. Reference numeral 1908 designates a light diffusing structure. Reference numeral 1910 designates a second optical-path converting structure. Reference numeral 1912 designates a light emitting device. Reference numeral 1914 designates a light receiving device.

As illustrated in FIG. 12B, optical transmission can be effectively performed when a common signal is transmitted using four light beams from the beginning. Loss of optical power can be reduced, as compared with a case where a light beam is split into four light beams for transmission. Each of the four light beams propagating in the two-dimensional optical waveguide apparatus can be coupled to the light diffusing structure 1908, when necessary. Each light beam is thus diffused by the light diffusing structure 1908 in 360-degree directions, or in regional directions. The light beam can also be transmitted as it is such that the light can be deflected by the mirror.

When the second polygonal pyramid-shaped optical-path converting structure 1910 is used, light coupled to a slant face of the polygonal pyramid-shaped structure can be deflected upward such that the light receiving device having an array structure can receive plural optical signals.

In the sixth embodiment, the arrayed-type VCSEL with four light emission ports is used, but the number of light emission ports is not limited thereto. This number can be equal to or less than the number of slant faces of the first polygonal pyramid-shaped optical-path converting structure. Further, the quadruple pyramid-shaped structure is used as the first optical-path converting structure 1906 in this embodiment, but it can be a wedge-shaped structure, or a polygonal pyramid-shaped structure. The second optical-path converting structure 1910 can likewise have a structure similar to that the first optical-path converting structure 1906. Further, the second optical-path converting structure is not necessarily needed.

When a structure serving as a mirror is disposed in the optical circuit layer, the light beam can be deflected as it is such that the optical signal can be transmitted avoiding obstacles, such as a via, in the optical circuit layer.

Figure 13:
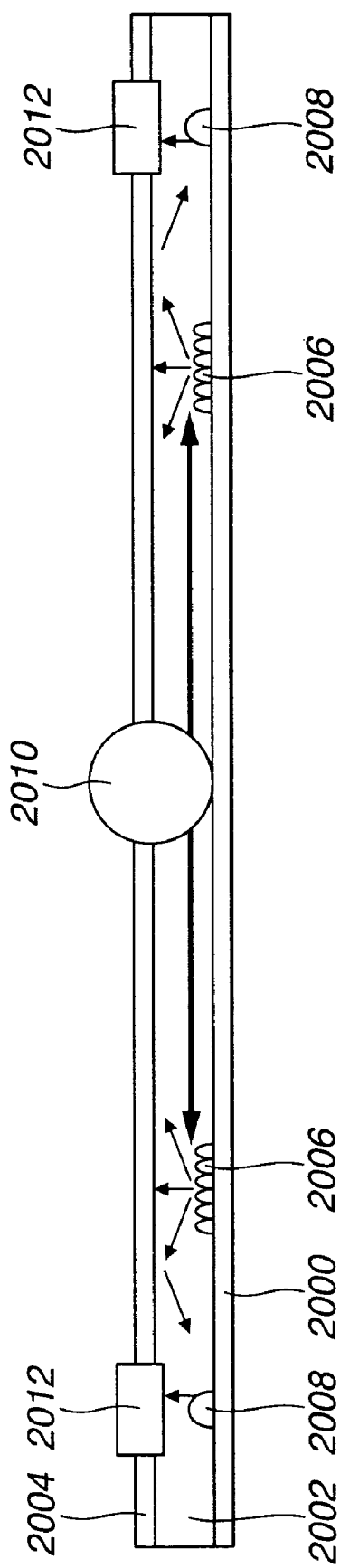
FIG. 13 is a cross-sectional view illustrating a seventh embodiment of a two-dimensional optical waveguide apparatus according to the present invention.

FIG. 13 illustrates a cross section of a two-dimensional optical waveguide apparatus of a seventh embodiment in which a spherical light emitting device with an electronic device integrally formed on its surface is filled in the two-dimensional waveguide. In FIG. 13, reference numeral 2000 designates a first cladding layer. Reference numeral 2002 designates a core layer. Reference numeral 2004 designates a second cladding layer. Reference numeral 2006 designates a light diffusing structure. Reference numeral 2008 designates an optical-path converting structure. Reference numeral 2010 designates a spherical light emitting device. Reference numeral 2012 designates a light receiving device.

Figure 15:
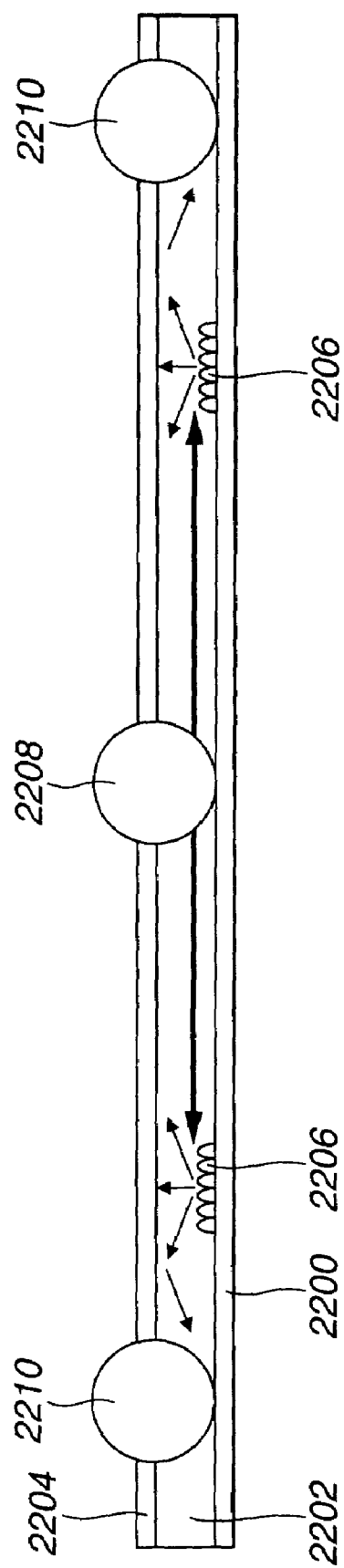
FIG. 15 is a cross-sectional view illustrating a modification of the seventh embodiment.

Further, FIG. 15 illustrates a cross-section of a similar two-dimensional optical waveguide apparatus of a modification of the seventh embodiment in which a spherical light emitting device with an electronic device integrally formed on its surface and a spherical light receiving device with an electronic device integrally formed on its surface are arranged in the two-dimensional optical waveguide. In FIG. 15, reference numeral 2200 designates a first cladding layer. Reference numeral 2202 designates a core layer. Reference numeral 2204 designates a second cladding layer. Reference numeral 2206 designates a light diffusing structure. Reference numeral 2208 designates a spherical light emitting device. Reference numeral 2210 designates a spherical light receiving device. The spherical light receiving device 2210 formed in the two-dimensional optical waveguide can effectively receive an optical signal transmitted in the optical waveguide without using the optical-path converting structure, or the like.

Figure 14B:
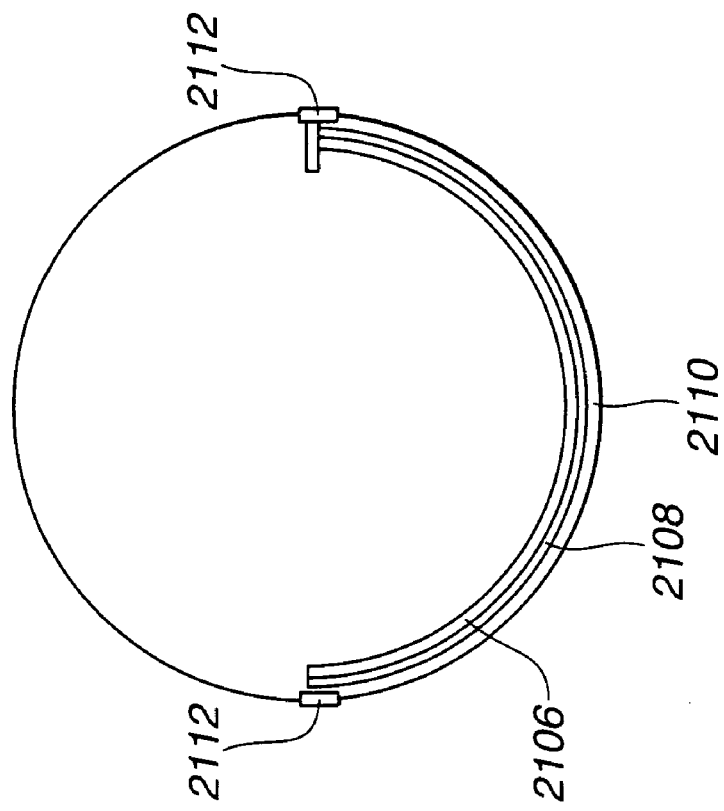
FIGS. 14A and 14B are views illustrating a spherical light emitting device and a spherical light receiving device, respectively.
Figure 14A:
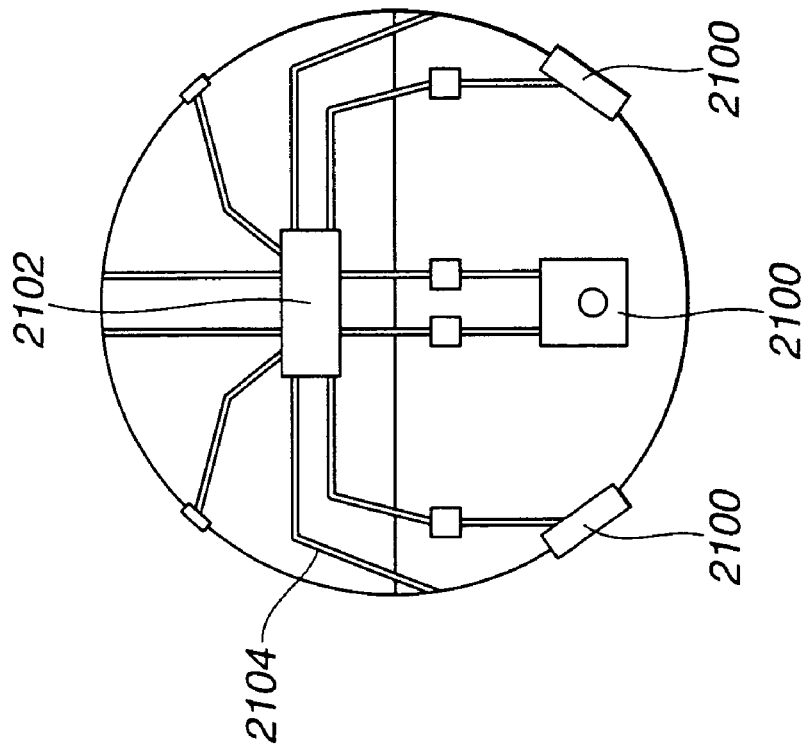

FIGS. 14A and 14B illustrate the spherical light emitting device and the spherical light receiving device, respectively. In FIGS. 14A and 14B, reference numeral 2100 designates a light emitting device. Reference numeral 2102 designates an electronic device. Reference numeral 2104 designates an electronic circuit. Reference numeral 2106 designates an n-type layer of the spherical light receiving device. Reference numeral 2108 designates an i(intrinsic)-layer. Reference numeral 2110 designates a p-type layer. Reference numeral 2112 designates an electrode for the light receiving device.

As illustrated in FIG. 14A, optical transmission can be effectively performed when the same signal is transmitted using four light beams from the four light emitting devices 2100 formed in the spherical device. Loss of optical power can be reduced, as compared with a case where a light beam is split into four light beams for transmission. The electronic device 2102 formed on the surface of the spherical device is a CMOS circuit for driving the light emitting devices 2100.

In this embodiment, four light emitting devices 2100 are GaInNAs/AlGaAs-system VCSELs formed on four [111] faces, respectively, but they are not limited thereto. Those can be β-FeSi$_2$-system devices. Further, although the electronic device 2102 formed on the surface of the spherical device is the circuit for driving the light emitting devices in FIG. 14A, it can be a parallel/serial converting circuit, an integrated device including a driving circuit and a parallel/serial converting circuit, or the like. Furthermore, a plurality of electronic devices can be formed.

In the spherical light receiving device, a p-i-n layer is formed on a surface of a spherical Si substrate (for example, a southern hemispherical side), and a circuit for applying a reverse bias to the light receiving portion, an amplifying circuit, and the like (not shown) are formed on another hemispherical side (for example, a northern hemispherical side) opposite to the side of the light receiving portion.

When necessary, four light beams propagating in the two-dimensional optical waveguide apparatus can be coupled to the light diffusing structures 2006 and 2206 so as to be diffused toward 360-degree all directions, or toward directions of a predetermined angular range.

The two-dimensional optical waveguide apparatus of this embodiment can be combined with an electronic circuit board to construct an opto-electronic hybrid circuit board, similar to the second embodiment. When a structure serving as the mirror is disposed in the optical circuit layer, the light beam can be deflected as it is such that the optical signal can be transmitted avoiding obstacles, such as a via, in the optical circuit layer.

Figure 16:
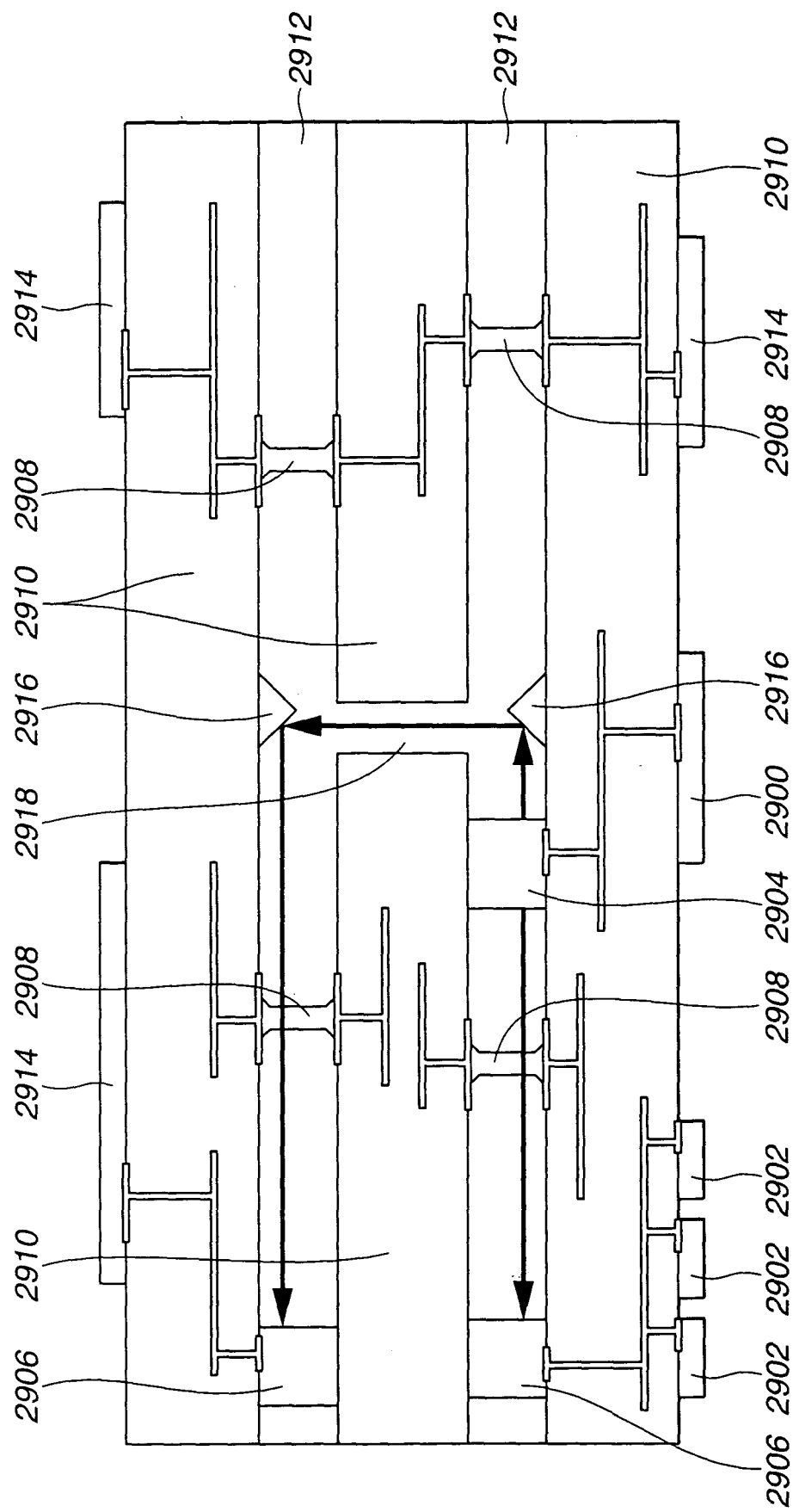
FIG. 16 is a cross-sectional view illustrating an eighth embodiment of an opto-electronic hybrid circuit board according to the present invention.

FIG. 16 illustrates a cross-section of an opto-electronic hybrid circuit board of an eighth embodiment which includes two optical circuit layers connected through an optical through-hole. In FIG. 16, reference numeral 2900 designates a CPU. Reference numeral 2902 designates a RAM. Reference numeral 2904 designates a light emitting device. Reference numeral 2906 designates a light receiving device. Reference numeral 2908 designates a via. Reference numeral 2910 designates an electronic circuit layer. Reference numeral 2912 designates an optical circuit layer. Reference numeral 2914 designates an electronic device. Reference numeral 2916 designates an optical-path converting structure. Reference numeral 2918 designates an optical through-hole.

Since the optical circuit layers 2912 are connected through the optical through-hole 2918 as illustrated in FIG. 16, it is possible to transmit the optical signal coupled to an optical circuit layer to another plural optical circuit layer. The optical signal can be effectively transmitted over a wider range in such a construction in which plural optical circuit layers 2912 are connected to each other through the optical through-hole 2918.

In the structure of FIG. 16, the light beam can be transmitted in a direction perpendicular to the optical circuit layer 2912 when optical-path converting structures 2916 (for example, a minute conical, or polygonal pyramid-shaped light diffusing structure) are disposed above and below the perpendicularly-extending optical through-hole 2918. The optical-path converting structure 2916 having the above-noted function can be replaced by a mirror with the same function.

In this embodiment, the light beam from the light emitting device 2904 is transmitted to the light receiving device 2906 as it is, but the transmission manner is not limited thereto. For example, the light beam transmitted from the lower optical circuit layer to the upper optical circuit layer can be coupled to the light diffusing structure disposed in the upper optical circuit layer, and can be diffused toward 360-degree all directions, or toward directions of a predetermined angular range.

Further, although the optical through-hole 2918 is filled with the same material as that of the core layer of the two-dimensional optical waveguide layer in this embodiment, the material is not limited thereto. The inner portion of the optical through-hole 2918 can be air without using any material, or an optical fiber or a lens can be inserted into the inner portion of the optical through-hole 2918, for example.

Figure 17:
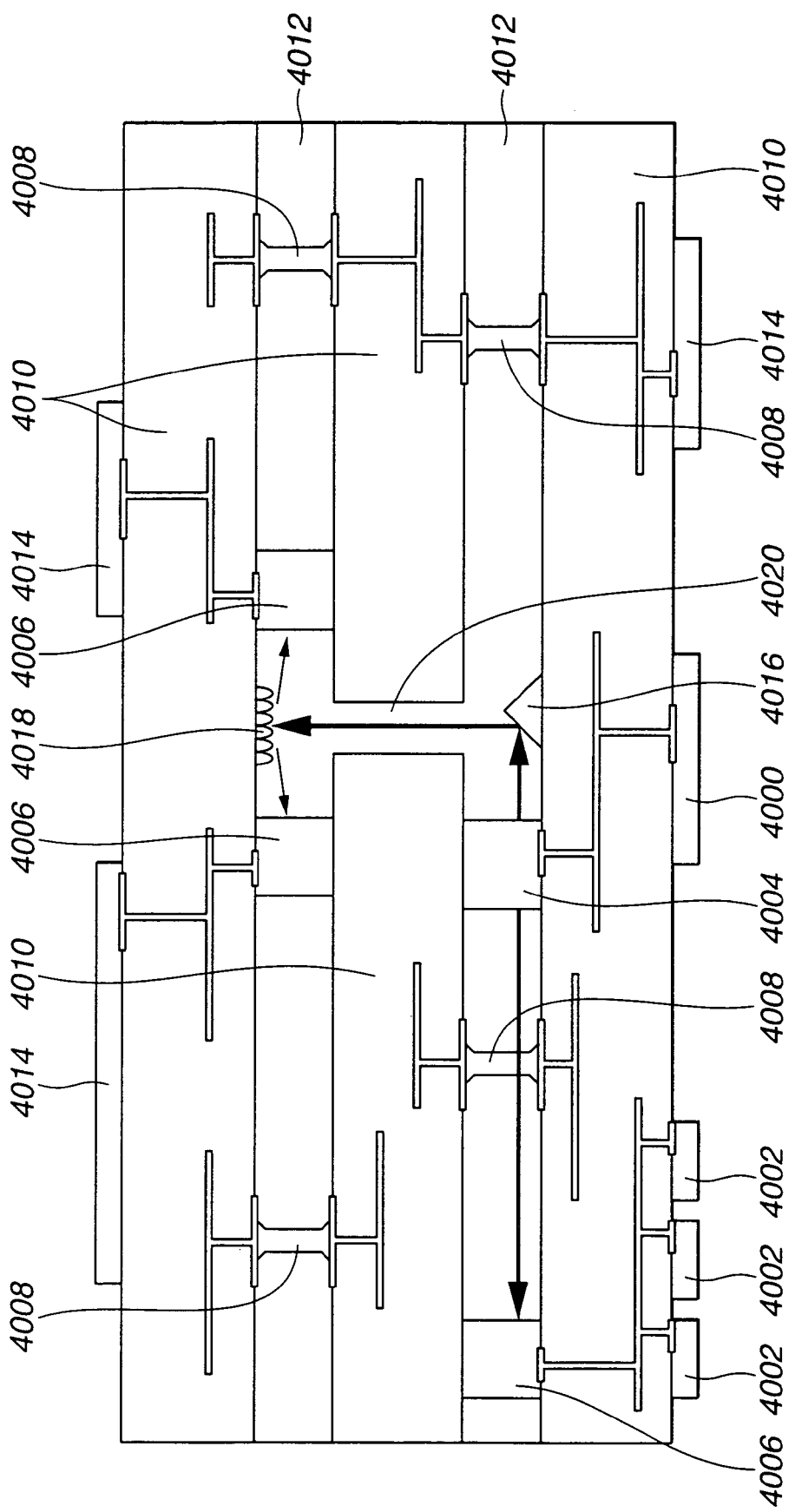
FIG. 17 is a cross-sectional view illustrating a ninth embodiment of an opto-electronic hybrid circuit board according to the present invention.

FIG. 17 illustrates a cross-section of an opto-electronic hybrid circuit board of a ninth embodiment which includes two optical circuit layers connected through an optical through-hole. In FIG. 17, reference numeral 4000 designates a CPU. Reference numeral 4002 designates a RAM. Reference numeral 4004 designates a light emitting device. Reference numeral 4006 designates a light receiving device. Reference numeral 4008 designates a via. Reference numeral 4010 designates an electronic circuit layer. Reference numeral 4012 designates an optical circuit layer. Reference numeral 4014 designates an electronic device. Reference numeral 4016 designates an optical-path converting structure. Reference numeral 4018 designates a light diffusing structure. Reference numeral 4020 designates an optical through-hole.

Like the eighth embodiment, the optical circuit layers 4012 are connected through the optical through-hole 4020 in the ninth embodiment, and hence it is possible to transmit the optical signal coupled to an optical circuit layer to another optical circuit layer.

In the ninth embodiment as illustrated in FIG. 17, the light diffusing structure 4018 is disposed immediately above the optical through-hole 4020, so that the light beam transmitted upward through the optical through-hole 402Q can be coupled to the light diffusing structure 4018, and diffused toward 360-degree all directions, or toward directions of a predetermined angular range. Also in this embodiment, the inner portion of the optical through-hole 4020 is filled with the same material as that of the core layer of the two-dimensional optical waveguide layer, but the material is not limited thereto.

Figure 18:
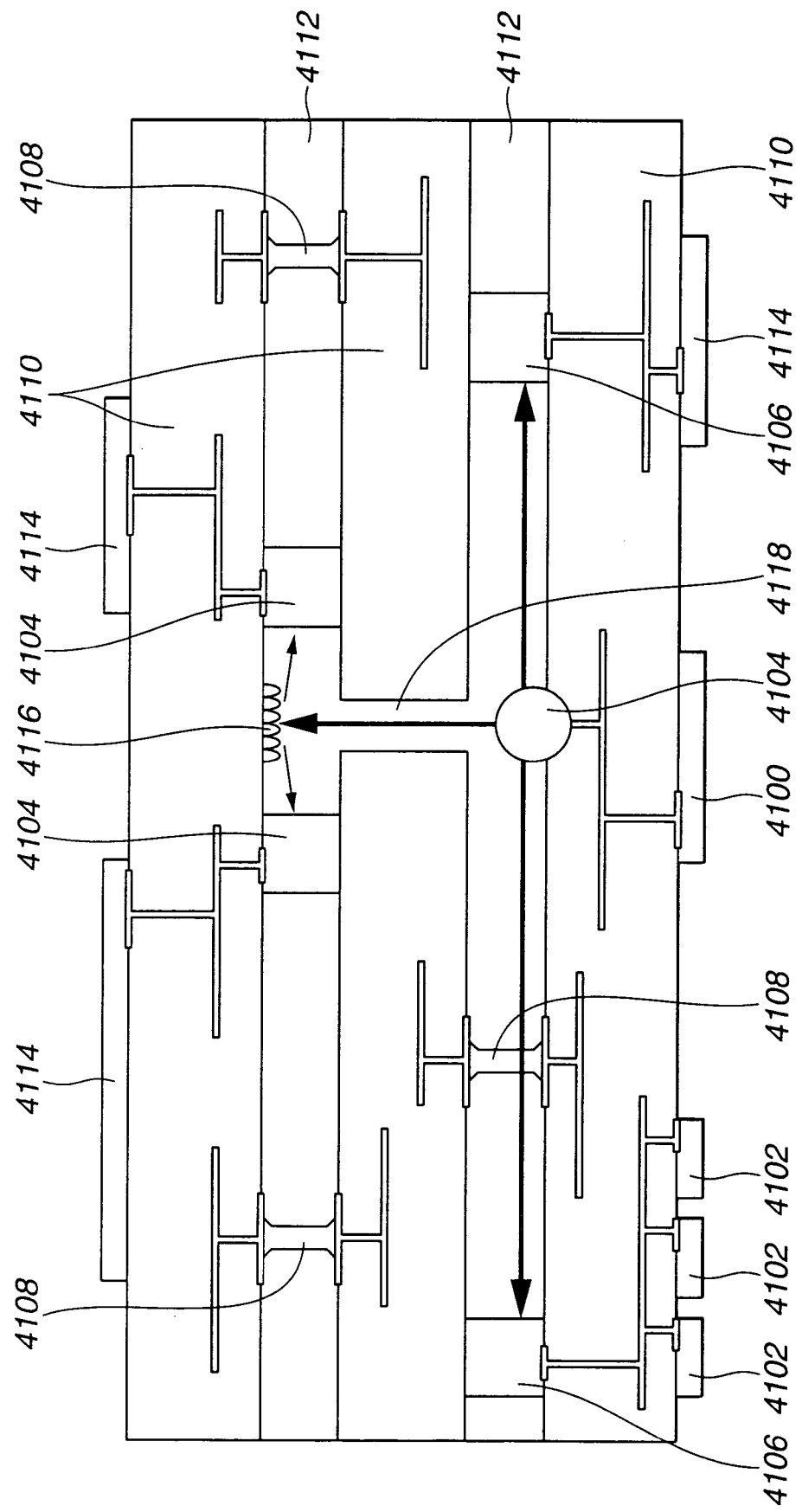
FIG. 18 is a cross-sectional view illustrating a tenth embodiment of an opto-electronic hybrid circuit board according to the present invention.

FIG. 18 illustrates a cross section of an opto-electronic hybrid circuit board of a tenth embodiment which includes two optical circuit layers connected through an optical through-hole. In FIG. 18, reference numeral 4100 designates a CPU. Reference numeral 4102 designates a RAM. Reference numeral 4104 designates a spherical light emitting device. Reference numeral 4106 designates a light receiving device. Reference numeral 4108 designates a via. Reference numeral 4110 designates an electronic circuit layer. Reference numeral 4112 designates an optical circuit layer. Reference numeral 4114 designates an electronic device. Reference numeral 4116 designates a light diffusing structure. Reference numeral 4118 designates an optical through-hole.

Like the eighth embodiment, the optical circuit layers 4112 are connected through the optical through-hole 4118 in the tenth embodiment, and hence it is possible to transmit the optical signal coupled to an optical circuit layer to another optical circuit layer.

In the tenth embodiment as illustrated in FIG. 18, the light diffusing structure 4116 is disposed immediately above the optical through-hole 4118, and the spherical light emitting device 4104 is disposed immediately below the optical through-hole 4118. Two light beams of three light beams emitted from the spherical light emitting device 4104 are transmitted through the lower optical circuit layer, while the remaining one emitted from the spherical light emitting device 4104 is transmitted through the optical through-hole 4118, and guided into the upper optical circuit layer. When the spherical light emitting device 4104 is used in such a manner, optical transmission can be more efficiently performed with reduced loss of optical power, as compared with a case where the light beam is guided into the optical through-hole using the optical-path converting structure to transmit the optical signal through plural optical wiring layers.

In the tenth embodiment, the light diffusing structure 4116 is disposed immediately above the optical through-hole 4118, but the structure is not limited thereto. The light beam can be coupled to the upper optical circuit layer by disposing an optical-path converting structure or a mirror at the same location. Also in this embodiment, the inner portion of the optical through-hole 4118 is filled with the same material as that of the core layer of the two-dimensional optical waveguide layer, the material is not limited thereto.

As described in the foregoing, in the two-dimensional optical waveguide apparatus according to the present invention, there is arranged a relay unit for relaying light transmitted from a light transmission side and propagating in a waveguide at a place between the light transmission side and the light reception side. Accordingly, flexible combinations of transmission, such as a combination of light-beam transmission and diffused-light transmission, can be selectively employed for transmission between the light transmission side and the light reception side, and signal transmission can be effectively performed with reduced loss of optical power. Further, when the two-dimensional optical waveguide apparatus of the present invention is used with an electronic circuit layer in a hybrid manner, the EMI problem and the like can be solved at a relatively low cost without alteration in design of the electronic circuit layer.

While the present invention has been described with respect to what is presently considered to be the preferred embodiments, it is to be understood that the invention is not limited to the disclosed embodiments. The present invention is intended to cover various modifications and equivalent arrangements included within the spirit and the scope of the appended claims.

What is claimed is:

1. An optical waveguide apparatus comprising:
   a sheet-shaped optical waveguide capable of propagating light in two-dimensional directions;
   a light emitting unit configured and positioned to emit at least two light beams in different directions to said waveguide;
   light receiving units for receiving light propagating in said waveguide;
   at least two light diffusing structures each of which diffuses one of the light beams emitted from said light emitting unit,
   wherein said light emitting unit emits the at least two light beams in different directions within said waveguide so that each light beam is directed toward and received by a different light diffusing structure; and
   a closed region having said light receiving units,
   wherein each of said light diffusing structures is located closer to one of the light receiving units than said emitting unit in said closed region,
   wherein each light beam emitted by said light emitting unit propagates to and is diffused in said closed region by one of said light diffusing structures to propagate in all directions therefrom within the closed region, and said light receiving units are located at positions that surround said at least two light diffusion structures within the closed region to receive the light diffused by said at least two light diffusing structures.

2. The optical waveguide apparatus according to claim 1, wherein said light diffusing structure is constructed such that a propagation condition of light propagating in said waveguide can be changed at a place on a light propagation path between said light emitting unit and at least one of said light receiving units in a relaying manner.

3. The optical waveguide apparatus according to claim 1, wherein said light diffusing structure has a thickness less than a thickness of a core layer of said waveguide.

4. The optical waveguide apparatus according to claim 1, wherein said light diffusing structure includes a structure capable of changing a propagation condition of light propagating in said waveguide without processing light in a regenerative manner by amplification and shaping.

5. The optical waveguide apparatus according to claim 1, wherein said waveguide has a structure in which a sheet-shaped core layer is sandwiched by a first cladding layer and a second cladding layer.

6. The optical waveguide apparatus according to claim 1, further comprising an optical-path converting structure for converting at least one light beam emitted from said light emitting unit into at least one light beam propagating in at least one predetermined direction, said optical-path converting structure being arranged in a portion of said waveguide below said light emitting unit.

7. The optical waveguide apparatus according to claim 6, wherein said optical-path converting structure has a spherical, hemispherical, conical, wedge-shaped, or polygonal pyramid-shaped structure.

8. The optical waveguide apparatus according to claim 1, wherein said light emitting unit, at least one of said light receiving units and said light diffusing structure are not located on a straight line extending along said sheet-shaped optical waveguide.

* * * * *

UNITED STATES PATENT AND TRADEMARK OFFICE
CERTIFICATE OF CORRECTION

PATENT NO. : 7,120,325 B1
APPLICATION NO. : 10/626535
DATED : October 10, 2006
INVENTOR(S) : Tatsuro Uchida Page 1 of 1

It is certified that error appears in the above-identified patent and that said Letters Patent is hereby corrected as shown below:

COLUMN 3:
Line 61, "Electronic" should read --An electronic--.

COLUMN 6:
Line 20, "but" should be deleted.

COLUMN 12:
Line 30, "that the" should read --that of the--.

COLUMN 14:
Line 56, "402Q" should read --4020--.

Signed and Sealed this

Thirty-first Day of July, 2007

JON W. DUDAS
*Director of the United States Patent and Trademark Office*